United States Patent
Tarnopolsky et al.

(10) Patent No.: US 7,591,746 B2
(45) Date of Patent: Sep. 22, 2009

(54) SYSTEM AND METHOD OF GETTING FOR A BICYCLE AND OTHER-PEDAL-DRIVEN VEHICLES MECHANICAL ENERGY OUTPUT EXCEEDED MUSCULAR ENERGY INPUT DUE TO THE GRAVITATIONAL LEVER.

(76) Inventors: Mikhail Tarnopolsky, 7110 Ridge Ct., Brooklyn, NY (US) 11209; Galina Tarnopolsky, 7110 Ridge Ct., Brooklyn, NY (US) 11209

( * ) Notice: Subject to any disclaimer, the term of this patent is extended or adjusted under 35 U.S.C. 154(b) by 267 days.

(21) Appl. No.: 10/738,335

(22) Filed: Dec. 18, 2003

(65) Prior Publication Data

US 2005/0137041 A1    Jun. 23, 2005

(51) Int. Cl.
  *F16H 7/06*    (2006.01)
  *F16H 55/30*   (2006.01)
  *F16H 57/08*   (2006.01)

(52) U.S. Cl. .................. 474/155; 474/160; 474/164; 475/344; 475/331

(58) Field of Classification Search .................. 474/71, 474/89, 87, 88, 84, 160, 74–78, 139, 155–156, 474/164, 162, 167, 178, 179, 344; 74/594.1–594.3, 74/63–64, 413, 465; 475/17, 348, 331, 349; 280/257–261; 185/27
See application file for complete search history.

(56) References Cited

U.S. PATENT DOCUMENTS

| | | | | |
|---|---|---|---|---|
| 597,098 A | * | 1/1898 | Bullis | 74/594.3 |
| 631,208 A | * | 8/1899 | Frazeur | 475/349 |
| 1,411,548 A | * | 4/1922 | Yamamoto | 475/269 |
| 3,151,495 A | * | 10/1964 | Kurtz | 74/413 |
| 3,469,464 A | * | 9/1969 | Peterson et al. | 474/156 |
| 3,975,969 A | * | 8/1976 | Osborn et al. | 74/465 |
| 4,309,043 A | * | 1/1982 | Brown | 280/236 |
| 4,425,824 A | * | 1/1984 | Koch | 475/17 |
| 4,560,182 A | * | 12/1985 | Yamaguchi | 280/257 |
| 4,640,154 A | * | 2/1987 | Osborn | 475/178 |
| 5,080,638 A | * | 1/1992 | Osborn | 475/179 |
| 5,207,119 A | * | 5/1993 | Garneau | 74/594.3 |
| 5,456,638 A | * | 10/1995 | Osborn | 474/164 |
| 5,921,133 A | | 7/1999 | Tarnopolsky | |
| 6,152,471 A | * | 11/2000 | Kang et al. | 280/261 |
| 6,363,804 B1 | | 4/2002 | Tarnopolsky | |
| 6,601,471 B2 | | 8/2003 | Tarnopolsky et al. | |
| 6,830,259 B2 | * | 12/2004 | Jakovljevic | 280/261 |
| 7,438,663 B2 | * | 10/2008 | Osborn et al. | 475/344 |
| 2005/0263978 A1 | * | 12/2005 | Ascher | 280/261 |

FOREIGN PATENT DOCUMENTS

| | | | | |
|---|---|---|---|---|
| CH | 670429 A5 | * | 6/1989 | |
| FR | 2496586 A | * | 6/1982 | |
| FR | 2805516 A1 | * | 8/2001 | |
| JP | 08104281 A | * | 4/1996 | |
| WO | WO 9947410 A1 | * | 9/1999 | |

* cited by examiner

*Primary Examiner*—Marcus Charles

(57) ABSTRACT

A transmission that is rotatable and connectable to the gravity mass increases the speed of rotation.

4 Claims, 3 Drawing Sheets

SYSTEM AND METHOD OF GETTING FOR A BICYCLE AND OTHER-PEDAL-DRIVEN VEHICLES MECHANICAL ENERGY OUTPUT EXCEEDED MUSCULAR ENERGY INPUT DUE TO THE GRAVITATIONAL LEVER.

BACKGROUND OF THE INVENTION

A planetary transmission for a bicycle and a method of obtaining higher riding speed due to the interaction between transmissions are based on the experimental data of conversion of gravity into mechanical rotational energy (approved by U.S. Pat. Nos. 5,667,038; 5,921,133A; 6,363,804 B1; 6,601,478 B2) and experimental data of riding new type of bicycle having planetary transmission (approved by working model since 1999 and two prototypes since 2002).

The main difference between the regular and the new type of bicycles is in their pedals' system.

A regular bicycle has a balanced pedals' system with two similar pedals freely rotated around their axes under the foot's muscular energy.

The new type of bicycle has an unbalanced pedals' system with two different pedals. One pedal is a regular one and freely rotates around its axle under the foot's muscular energy.

The other is different in terms that it rotates around its axle not only under the foot's muscular energy, but also under the earth gravity in the positive zone of rotation and under the inertial energy supported by foot's muscular energy in the negative zone of rotation.

The gravitational pedal carries out two functions:
  to transmit the driving power from the foot's muscular energy to a drive wheel of a bicycle
  to transmit the driving power from the foot's muscular energy together with gravitational energy for its recirculation by means of inertial energy, appearing in a negative zone of rotation!

It can be proven by various tests, and gravitational pedal makes it much easier (spending less energy) to ride a bicycle.

The gravitational pedal together with the planetary transmission (FIG. 1, FIG. 2A. Parts # 4s;5;5A) makes it possible to ride with higher speed of about 35 MPH (average bicyclists speed is of 15-17 MPH) spending the same muscular energy.

This idea can be a first step towards the production of a faster and more efficient engine systems.

SUMMARY OF THE INVENTION

The object of the present intention is provide a new planetary transmission for a bicycle and a method of obtaining higher riding speed.

In keeping with these objectives (and with others which will become apparent hereinafter) one feature of the present invention resides, briefly stated, in a planetary transmission for a bicycle and in a method of obtaining higher riding speed, which has a first rotatable unbalanced element as a receiver of the power from the foot's muscular energy and gravitational energy,
  converting both of them (muscular and gravitational) into mechanical energy for transmitting the driving power via the second, one-way directional rotatable element, and the third opposing rotatable element, to a driving sprocket of a bicycle, which is attached to the third element, and freely rotates with the third element on a crank's axle for transmitting the driving power via a chain to a freewheel and then to a drive wheel of a bicycle, where the bicycle is in a course of forward motion from the pedals,
  and the first rotatable element, being connected to the crank by means of a leading axle, rotates clockwise together with the crank's axle under the foot's muscular energy and the earth gravity into a positive zone of rotation, and under the inertial energy appearing in the negative zone of rotation together with the muscular energy, and at the same time the first element rotates counter-clockwise around it's own axis of rotation together with the leading axle, powered by the foot muscles and the displaced unbalanced mass, while the second rotatable element, being connected to the first rotatable element by means of the overrunning clutch, and also connected to the third element by means of toothing, rotates clockwise around the third element and around the crank's axes of rotation,
  and powered the same way as the first element, and at the same time, the second element rotates counter-clockwise around its own axle of rotation, powered the same way as the first element on its counter-clockwise rotation, and, consequently, makes the third element with the driving sprocket on it, rotate faster than the usual system (meaning the system without this transmission) using the same muscular energy.

The method of this invention is based on the interaction between two groups of parts of the transmission, one of which is placed on the crank's axle for a free rotation around it, while the other part is placed on the crank's axle for rotation with it.

The invention itself, however, both as to its structure and as to its manner of operation, will be best understood from the following description of a preferred embodiment, which is accompanied by the following drawings.

DETAILED DESCRIPTION OF THE INVENTION

Figure 1:
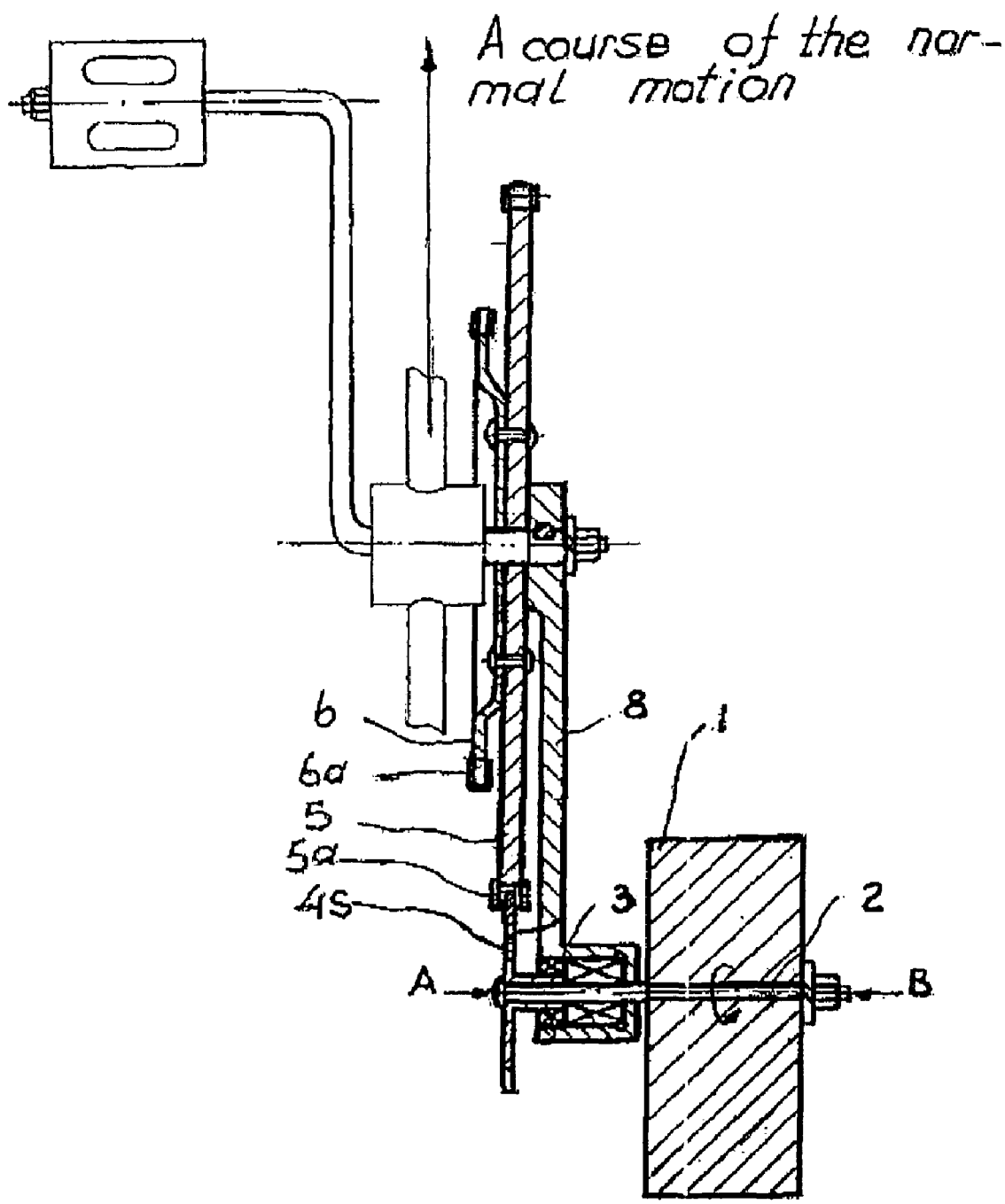
FIG. 1 is a vertical sectional view of the schematic representation of a planetary transmission for a bicycle
Figure 2B:
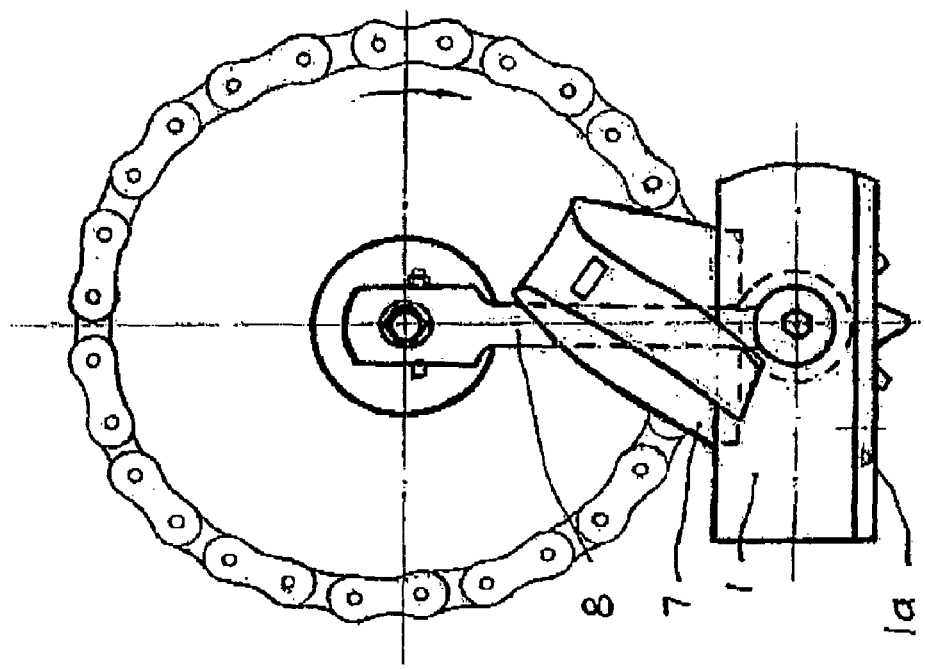
FIG. 2B is a side view according to the arrow "B", shown in FIG. 1.
Figure 2A:
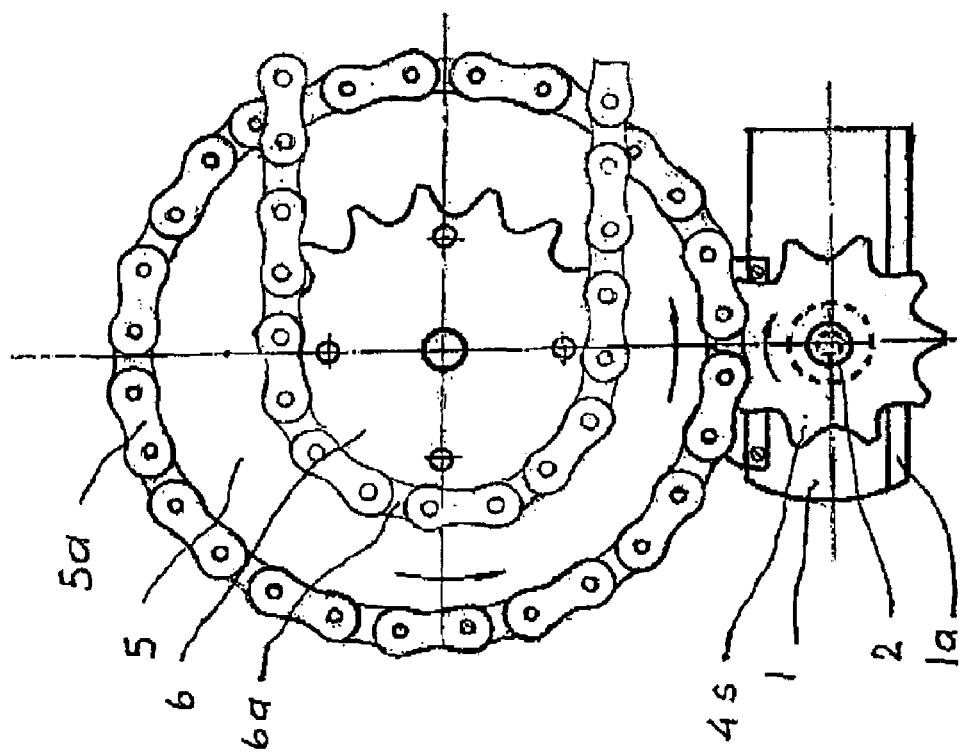
FIG. 2A is a rear view according to the arrow "A", shown in FIG. 1.

A preferred embodiment of a planetary transmission of the present invention is illustrated in FIG. 1 (vertical sectional view), FIG. 2A (rear view) and FIG. 2B (side view).

A planetary transmission for a bicycle consisting of a crank 8 and crank's axle (not numbered) as a base for the interaction between two groups of transmission parts, one of which is placed on a crank's axle for rotation around the axle, while the other group of transmission parts is placed on a crank's axle for rotation with the axle. The first group of transmission parts includes sun disk 5 of a planetary mechanism. The second group of transmission parts includes the crank 8. The interaction between two groups of transmission parts will be best understood from the following comparison of a new planetary transmission with the usual transmission for a regular bicycle.

A regular bicycle with the usual transmission has a balanced pedals' system with two similar pedals, which are alternately powered by foots muscles and freely rotates around their axes.

A driving sprocket of a regular bicycle is attached to a crank's axle and rotates with the axle as well as the pedals with the same speed. One turn of the pedals provides one turn of the driving sprocket.

A new type of a bicycle with a planetary transmission has an unbalanced pedals' system with two different pedals. One pedal is a regular one and freely rotates around its axle powered by foot muscles. The other pedal is different in terms that it rotates not only around its axle, but together with a leading axle 2 and powered not only by foot muscles but also by earth gravity (in positive zone of rotation) and by inertia, which is supported by foot muscles by means of a strap 7 (in a negative zone of rotation) because of that this pedal is named "gravitational" and has been assigned reference numeral 1.

Figure 3:
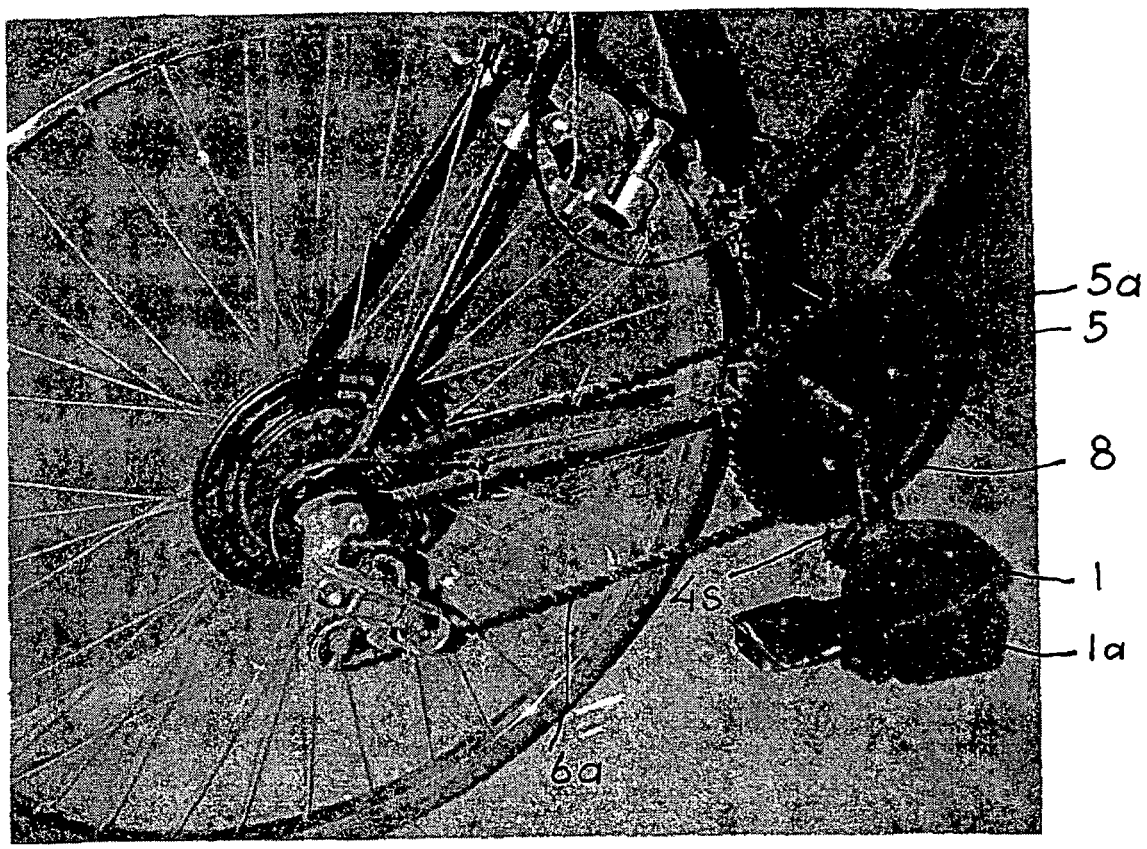
FIG. 3 is a photograph showing a side perspective view of the device of the present invention connected to a transmission and rear wheel of a bicycle.

The gravitational pedal 1 with an attached unbalanced mass 1a is not symmetrical relative to the axle of rotation 2 (see all drawings). A displacement, which is taken place, provides a possibility for keeping counter-clockwise rotation of the gravitational pedal 1 around its axle together with a leading axle 2, spending the same muscular energy as usual. It is proven by various tests it is also proven by tests, that after reaching a certain speed of rotation of the gravitational pedal (around 3 MPH) it makes much easier (spending less energy) to ride a bicycle. Gravitational pedal 1 connecting to the crank 8 from the side shown by arrow B (FIG. 1) by means of a leading axle 2 and a threaded fastening. From the side shown by arrow A (FIG. 1) axle 2 connecting with a satellite sprocket 4s as toothing part of an overrunning clutch 3. Such combination, which is known as a standard freewheel, uses in the present invention for a kinematical interaction between gravitational pedal 1 and sun disk 5 by means of a chainomatic periphery 5a (meaning the chain that is fastened to a sun disk 5) (See FIG. 1, FIG. 2A and FIG. 3). Chain 6a as seen in FIG. 3, is a separate free chain. The external toothing in this case is dangerous for a bicyclist and cannot be used. Driving sprocket 6 is attached to a sun disk 5 and always rotates together with a sun disk 5.

The kinematic relation between the pedal 1, satellite sprocket 4s and driving sprocket 6 is as follows: one clockwise turn of the pedal 1 together with a crank 8 around the crank's axle is making by means of an overrunning clutch 3 one clockwise turn of the sun disk 5 together with a driving sprocket 6. At the same time pedal 1 by means of the same overrunning clutch 3 is making one counter-clockwise turn around its own axle together with the leading axle 2 and satellite sprocket 4s, which is making an additional clockwise turn of a sun disk 5 together with a driving sprocket 6 by means of a chainomatic periphery 5a.

So that, one turn of a gravitational pedal 1 is making more than one turn of a driving sprocket 6, using the same muscular energy. An additional turn of a driving sprocket 6 depends of the chosen kinematic relations between the satellite sprocket 4s and chainomatic periphery 5a of a sun disk 5.

In the prototype of the present invention the sun disk 5 with the driving sprocket 4s thereon outstrips the pedal 1 with a crank 8 by a distance equivalent to the radius of a sundisk 5 with its chainomatic periphery 5a, because in this prototype the length of the circle of the satellite 4s is equal to the radius of a sun disk 5 with the chainomatic periphery 5a thereon.

It should be understood, of course, that the foregoing relates to exemplary embodiments of the invention and that modifications may be made without departing from the spirit and scope of the invention as set forth in the following claims.

The invention claimed is:

1. A planetary transmission for a bicycle, comprising:
a first rotatable element, which is an unbalanced element, as a receiver of power from a foot's muscular energy and gravitational energy, converting both of them into mechanical energy for transmitting the driving power via a one-way directional second rotatable element, and a third opposing rotatable element to a driving sprocket of a bicycle, which is attached to the third element and freely rotates with this third element on a crank axle for transmitting of the driving power via a chain to a free wheel and then to a drive wheel of a bicycle, where the bicycle is in a course of forward motion from the pedals, and the first rotatable element, being connected to the crank by means of a leading axle, rotates clockwise together with the crank axle into positive zone of rotation, and in the negative zone of rotation, where the inertial energy is appearing, due to the increased speed of rotation in the positive (active) zone of rotation, and at the same time the first element rotates counter-clockwise around its own axis of rotation together with the leading axle, while the second rotatable element being connected to the first rotatable element by means of the overrunning clutch, and also connected to the third element by means of toothing, rotates clockwise around the third element and around the crank's axes of rotation, and powered the same way as the first element on its clockwise rotation, and at the same time the second element rotates counter-clockwise around its own axle of rotation, powered the same way as the first element on its counter-clockwise rotation, and consequently, makes the third element with the driving sprocket on it, rotate faster than without the transmission using the same muscular energy.

2. The planetary transmission of claim 1, wherein the first rotatable element is a gravitational pedal.

3. The planetary transmission of claim 1, wherein the third element is a sun disk with a chainomatic periphery instead of a gear periphery and wherein the second element is a satellite sprocket combined with an overrunning clutch.

4. A method of obtaining higher riding speed comprising the steps of:
placing a first rotatable element on a crank,
placing a second rotatable element, which is a one-way directional element, on the first element, connecting the first element and the second element to one another by means of an over-running clutch,
placing the third element on the crank axle for free rotation on it,
attaching the crank to the crank axle for rotation together with it,
rotating the first element, powered by a foot's muscular energy and gravitational energy and converting that energy into mechanical energy for transmission of driving power, via the second rotatable element to a third opposing rotatable element, which together with a driving sprocket freely rotates on the crank axle wherein the crank, which is connected to the crank axle, rotates clockwise together with the first element, the first and the second elements at the same time rotate counter-clockwise around their own axes of rotation together with the leading axle, which connects the first element to the crank, the second rotatable element being connected to the first and to the third elements and making the third element and the driving sprocket rotate faster than when driving sprocket rotates together with the crank axle under the same power conditions.

* * * * *